United States Patent [19]

Epstein et al.

[11] Patent Number: 5,147,968

[45] Date of Patent: Sep. 15, 1992

[54] ELECTROMAGNETIC RADIATION ABSORBERS AND MODULATORS COMPRISING POLYANILINE

[75] Inventors: Arthur J. Epstein, Bexley; John M. Ginder, Columbus; Mitchell G. Roe, Columbus; Hamid Hajiseyedjavadi, Columbus, all of Ohio

[73] Assignee: The Ohio State University Research Foundation, Columbus, Ohio

[21] Appl. No.: 764,236

[22] Filed: Sep. 23, 1991

Related U.S. Application Data

[62] Division of Ser. No. 193,964, May 13, 1988, Pat. No. 5,079,334.

[51] Int. Cl.[5] .................. C08G 65/38; B05D 3/06; B05D 3/14
[52] U.S. Cl. .................. 528/210; 528/391; 528/422; 528/487; 524/422; 524/429; 524/438; 427/45.1; 427/47; 427/53.1; 427/54.1; 427/55
[58] Field of Search .............. 528/210, 391, 422, 487; 524/422, 429, 438; 427/47, 53.1, 54.1, 55, 45.1

[56] References Cited

U.S. PATENT DOCUMENTS

| | | | |
|---|---|---|---|
| 3,708,289 | 1/1973 | Timmerman | 528/390 |
| 4,615,829 | 10/1986 | Tamura | 528/422 |
| 4,798,685 | 1/1989 | Yaniger | 528/422 |
| 4,806,271 | 2/1989 | Yaniger | 528/422 |
| 4,851,487 | 7/1989 | Yaniger | 528/391 |
| 4,940,640 | 7/1990 | MacDiarmid | 528/422 |
| 5,008,041 | 4/1991 | Cameron | 528/422 |

*Primary Examiner*—Morton Foelak
*Assistant Examiner*—P. Hampton-Hightower
*Attorney, Agent, or Firm*—Frank H. Foster

[57] ABSTRACT

A composition for absorbing electromagnetic radiation (such as microwave, infrared, visible light radiation ultraviolet radiation), wherein said electromagnetic radiation possesses a wavelength generally in the range of from about 1000 Angstroms to about 50 meters, wherein said composition comprises a polyaniline composition of the formula

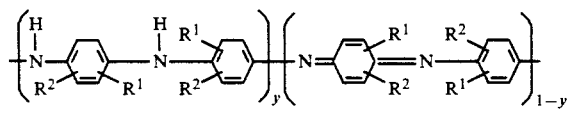

where y can be equal to or greater than zero and R' and $R_2$ are independently selected from the group consisting of —H, —OCH$_3$, —CH$_3$, —F, —Cl, —Br, —I, —NR$^3{}_2$, —NHCOR$_3$, —OH, —O, —SR$^3$, —OR$^3$, —OCOR$^3$, —NO$_2$, —COOH, —COOR$^3$, —COR$^3$, —CHO, and —CN, where R$^3$ is a C$_1$ to C$_a$ alkyl, aryl or aralkyl group.

5 Claims, 5 Drawing Sheets

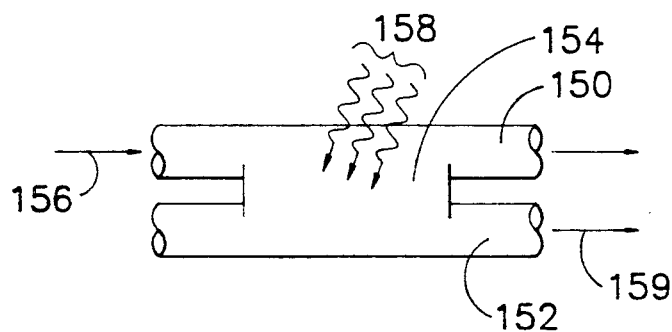
FIG. 5  FIG. 6
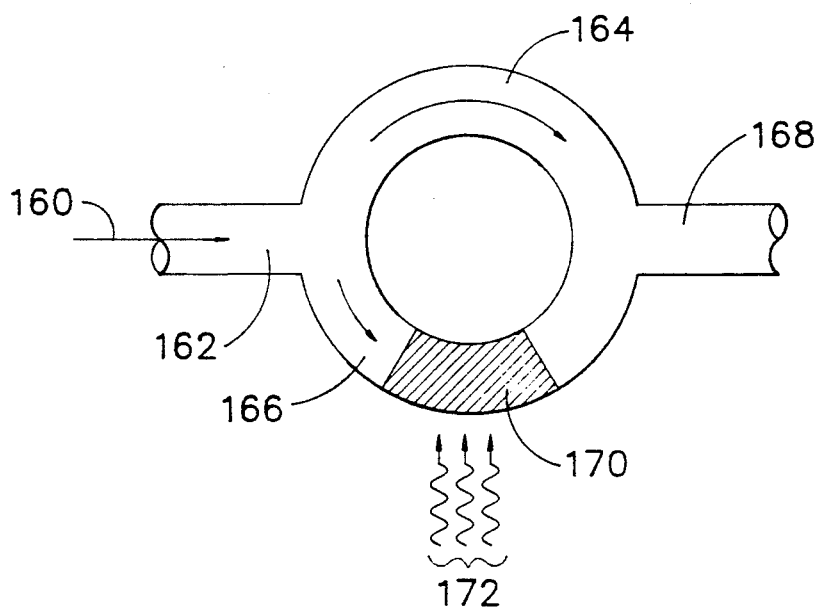
FIG. 7
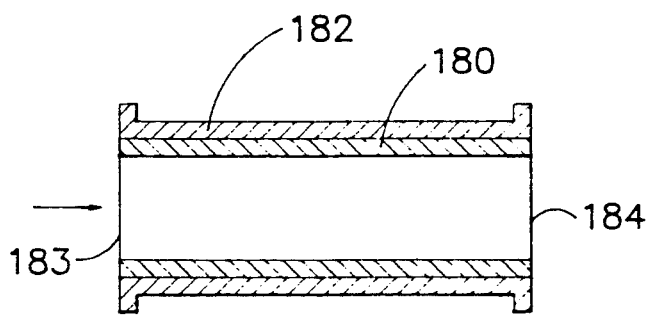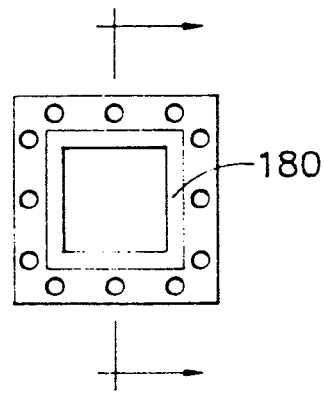
FIG. 8  FIG. 9

ELECTROMAGNETIC RADIATION ABSORBERS AND MODULATORS COMPRISING POLYANILINE

This invention was made with government support under Contract N00014-86K-0766 awarded by the Department of Navy. The government has certain rights in the invention.

This is a division of application Ser. No. 193,964, filed May 13, 1988, now U.S. Pat. No. 5,079,334.

BACKGROUND OF THE INVENTION

The invention relates to the use of polyaniline or derivatives thereof for absorbing electromagnetic radiation, including microwaves, radar waves, infrared waves, visible light waves, and ultraviolet waves. The invention further relates to the use of the radiation absorbing polyaniline compositions to modulate another electromagnetic beam. The invention also relates to the modification of the electromagnetic response of polyaniline compositions by chemical or electrochemical means. The invention further relates to electronic and microelectronic devices based on the chemical and physical properties of polyaniline and its derivatives, and the control of the properties.

When a spectrum of radiant energy is directed into a sample of some substances, several things may happen to the energy: (1) it may pass through the sample with little absorption taking place and therefore, little energy loss. (2) The direction of propagation of the beam may be altered by reflection, refraction, or diffraction. Scattering of the beam by particulate suspended matter may also be involved. (3) The radiant energy may be absorbed entirely or in part. The absorption involves a transfer of energy to the medium, and the absorption process is a specific phenomenon related to characteristic molecular and electronic structures; the wavelengths of certain components of the radiation may be absorbed while others pass through essentially undisturbed, depending on the characteristics of the substance. Components of the radiation are absorbed if its energy matches that energy which is required to raise molecular or ionic components of the sample from one energy level to another. Those energy transitions may involve vibrational, rotational, or electronic states. After it has been absorbed, that energy may be emitted as fluorescence, utilized to initiate chemical reactions, or actually dissipated as heat energy.

When molecules interact with radiant energy in the visible and ultraviolet region, the absorption consists in displacing an outer electron in the molecule, although sometimes the energy of the far ultraviolet is sufficient to exceed the energy of dissociation of certain bonds.

The absorption of radiant energy is a highly specific property of the molecular structure, and the frequency range within which energy can be absorbed is specifically dependent upon the molecular structure of the absorbing material. The smaller the energy difference between the ground state and the excited electronic state, the lower will be the frequency of absorption (i.e., the longer the wavelength). Chemical compounds with only single bonds involving sigma-valency electrons exhibit absorption spectra only below approximately 150 millimicrons. In covalently saturated compounds containing heteroatoms, such as nitrogen, oxygen, sulfur, and halogen, unshared p-electrons are present in addition to sigma electrons. Excitation promotes a p-orbital electron into an antibonding sigma orbital, such as occurs in ethers, amines, sulfides, and alkyl halides. In unsaturated compounds absorption results in the displacement of pi-electrons. Molecules containing single absorbing groups, called chromophores, undergo electronic absorption transitions at characteristic wavelengths, and the intensity of the absorption will be proportional to the number of that type of chromophore present in the molecule. Marked bathochromic shifts (absorption at longer wavelengths) occur when —OH, —NH$_2$, and —SH, for example, replace hydrogen in unsaturated groups.

It is desirable for certain applications to have a material whose radiation absorption characteristics and index of refraction can be easily and reversibly modulated. Various polymeric materials have been investigated including polyacetylene, polymethylacrylonitrile, pyrazoline, tetracyanoethylene, tetracyanonaphthoquinodimethane, tetracyanoquinodimethane, polydiacetylene, polypyrrole, poly(N-methyl-pyrrole), polyphenylene vinylene, and polythiophene. Some of these polymeric materials are known to exhibit photoresponsive effects, but the materials have deficiencies when considered for certain electromagnetic applications. For example, polyacetylene and polydiacetylene are nonaromatic, possess unacceptable absorption band gaps, have limited photoresponse, are air sensitive, generally cannot be derivatized, and are not readily soluble and therefore cannot be easily deposited as a thin film from solution. In addition, most materials previously investigated for electromagnetic radiation absorption are not readily tunable, i.e., the photoresponses of the materials cannot be reversibly modulated by an external source of energy.

Organic polymers have long been studied for electronic transport and, more recently, for optical properties. The first organic polymers prepared were electrically insulating with conductivities as low as $10^{-14}$ (ohms cm)$^{-1}$. The insulating properties are the result of all the electrons in the polymer being localized in the hybrid-atom molecular orbital bonds, i.e. the saturated carbon framework of the polymer. These insulators, which include polymers such as poly(n-vinylcarbazole), or polyethylene, have extremely large band gaps with energy as high as 10 eV required to excite electrons from the valence to the conduction band. Electrical applications of insulating organic polymers are limited to insulating or supporting materials where low weight and excellent processing and mechanical properties are desirable.

High electrical conductivity has been observed in several conjugated polymer or polyene systems. The first and simplest organic polymer to show high conductivity was "doped" polyacetylene In the "doped" form its conductivity is in excess of 200 (ohm cm)$^{-1}$. Although polyacetylene was first prepared in the late 1950's, it was not until 1977 that this polyene was modified by combining the carbon chain with iodine and other molecular acceptors to produce a material with metallic conductivity.

Polyaniline is a family of polymers that has been under intensive study recently because the electronic and optical properties of the polymers can be modified through variations of either the number of protons, the number of electrons, or both. The polyaniline polymer can occur in several general forms including the so-called reduced form (leucoemeraldine base), possessing the general formula

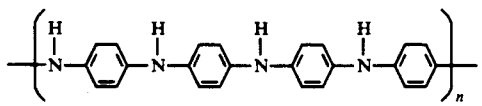

the partially oxidized so-called emeraldine base form, of the general formula

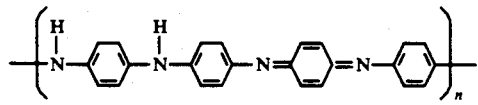

and the fully oxidized so-called pernigraniline form, of the general formula

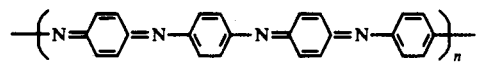

In practice, polyaniline generally exists as a mixture of the several forms with a general formula (I) of

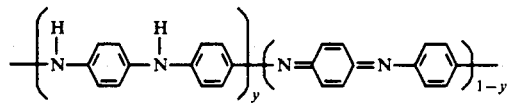

When $0<y<1$ the polyaniline polymers are referred to as poly(paraphenyleneamineimines) in which the oxidation state of the polymer continuously increases with decreasing value of y. The fully reduced poly(paraphenyleneamine) is referred to as leucoemeraldine, having the repeating units indicated above corresponding to a value of $y=1$. The fully oxidized poly(paraphenyleneimine) is referred to as pernigraniline, of repeat unit shown above corresponds to a value of $y=0$. The partly oxidized poly(paraphenyleneimine) with y in the range of greater than or equal to 0.35 and less than or equal to 0.65 is termed emeraldine, though the name emeraldine is often focused on y equal to or approximately 0.5 composition. Thus, the terms "leucoemeraldine", "emeraldine" and "pernigraniline" refer to different oxidation states of polyaniline. Each oxidation state can exist in the form of its base or in its protonated form (salt) by treatment of the base with an acid.

The use of the terms "protonated" and "partially protonated" herein includes, but is not limited to, the addition of hydrogen ions to the polymer by, for example, a protonic acid, such as mineral and/or organic acids. The use of the terms "protonated" and "partially protonated" herein also includes pseudoprotonation, wherein there is introduced into the polymer a cation such as, but not limited to, a metal ion, $M^+$. For example, "50%" protonation of emeraldine leads formally to a composition of the formula

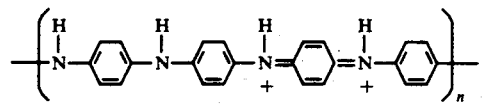

which may be rewritten as

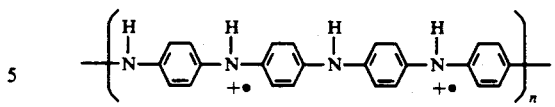

Formally, the degree of protonation may vary from a ratio of $[H^+]/[-N=]=0$ to a ratio of $[H^+]/[-N=]=1$. Protonation or partial protonation at the amine (—NH—) sites may also occur.

The electrical and optical properties of the polyaniline polymers vary with the different oxidation states and the different forms. For example, the leucoemeraldine base, emeraldine base and pernigraniline base forms of the polymer are electrically insulating while the emeraldine salt (protonated) form of the polymer is conductive. Protonation of emeraldine base by aqueous HCl (1M HCl) to produce the corresponding salt brings about an increase in electrical conductivity of approximately $10^{10}$; deprotonation occurs reversibly in aqueous base or upon exposure to vapor of, for example, ammonia. The emeraldine salt form can also be achieved by electrochemical oxidation if the leucoemeraldine base polymer or electrochemical reduction of the pernigraniline base polymer in the presence of an electrolyte of the appropriate pH. The rate of the electrochemical reversibility is very rapid; solid polyaniline can be switched between conducting, protonated and nonconducting states at a rate of approximately $10^5$ Hz for electrolytes in solution and even faster with solid electrolytes (E. Paul, et al., *J. Phys. Chem.* 1985, 89, 1441-1447) The rate of electrochemical reversibility is also controlled by the thickness of the film, thin films exhibiting a faster rate than thick films. Polyaniline can then be switched from insulating to conducting form as a function of protonation level (controlled by ion insertion) and oxidation state (controlled by electrochemical potential). Thus, in contrast to, for example, the polypyrrole mentioned above, polyaniline can be turned "on" by either a negative or a positive shift of the electrochemical potential, because polyaniline films are essentially insulating at sufficiently negative (approximately 0.00 V vs. SCE) or positive (+0.7 V vs. SCE) electrochemical potentials. Polyaniline can also then be turned "off" by an opposite shift of the electrochemical potential.

The conductivity of polyaniline is known to span 10 orders of magnitude and to be sensitive to pH and other chemical parameters. It is well known that the resistance of films of both the emeraldine base and 50% protonated emeraldine hydrochloride polymer decrease by a factor of approximately 3 to 4 when exposed to water vapor. The resistance increases only very slowly on removing the water vapor under dynamic vacuum. The polyaniline polymer exhibits conductivities of approximately 1 to 5 Siemens per centimeter (S/cm) when approximately half of its nitrogen atoms are protonated. Electrically conductive polyaniline salts, such as fully protonated emeraldine salt $[(-C_6H_4-NH-C_6H_4-NH^+)-Cl^-]_x$, have high conductivity ($10^{-4}$ to $10^{+2}$ S/cm) and high dielectric constants (20 to 200) and have a dielectric loss tangent of from below $10^{-3}$ to approximately $10^1$. Dielectric loss values are obtained in the prior art by, for example, carbon filled polymers, but these losses are not as large as those observed for polyaniline.

Polyaniline has been used to coat semiconductor photoelectrodes, to serve as an electrochromatic display material, and to suppress corrosion of iron.

While the preparation of polyaniline polymers and the protonated derivatives thereof is known in the art, it is novel herein to use these compositions for the attenuation of electromagnetic radiation, particularly microwaves, radar waves, infrared waves, visible waves, and ultraviolet waves. A need exists for a polymeric material which can be designed to absorb microwaves, radar waves, infrared waves, visible waves, and ultraviolet waves. In addition, a need exists for a method of absorbing the electromagnetic radiation to modulate another electromagnetic beam. A need also exists for a method for the modification of the electromagnetic properties of polyaniline compositions by chemical or electrochemical means.

SUMMARY OF THE INVENTION

The present invention relates to the use of polyaniline or derivatives thereof for absorbing electromagnetic radiation, including microwaves, radar waves, infrared waves, visible waves, and ultraviolet waves as needed. The invention further relates to the use of the radiation-absorbing polyaniline compositions to modulate another electromagnetic beam. The invention also relates to the modification of the electrical and optical properties of polyaniline compositions by chemical or electrochemical means. The invention further relates to electronic and microelectronic devices based on the chemical and physical properties of polyaniline and its derivatives.

While the invention relates to both microwave responses and nonlinear optical responses of polyaniline and its derivatives, the inventors believe that these phenomena are of different physical origins. The photoresponse is believed to be the result of the reorganization of chemical bonds and to be microscopic. The time frame is believed to be approximately $10^{-13}$ to $10^{-12}$ seconds (a rate of $10^{12}$ to $10^{13}$ Hz). The use of polyaniline compositions to achieve the microwave attenuation of the present invention, however, is believed to be due to a local reorganization of the electronic density on the order of $10^1$ to $10^2$ Angstroms and on a time frame of approximately $10^{-10}$ seconds. Both the photoresponse and the microwave attenuation phenomenae are believed to be due to the absorption of electromagnetic radiation by the pi electron systems of the polyaniline polymer and its derivatives.

BRIEF DESCRIPTION OF THE DRAWINGS

FIGS. 1-7 illustrate alternative embodiments of the invention utilizing the optical properties.

FIGS. 8-11 illustrate waveguides utilizing the microwave absorption properties of the invention for absorbing microwaves propagated through the waveguide.

FIGS. 15 and 1 illustrate microwave strip embodiments including an electrolyte for the controlled variation of the microwave absorption properties along the propagation axis of the microwave strip conductors.

DETAILED DESCRIPTION

Figure 1:
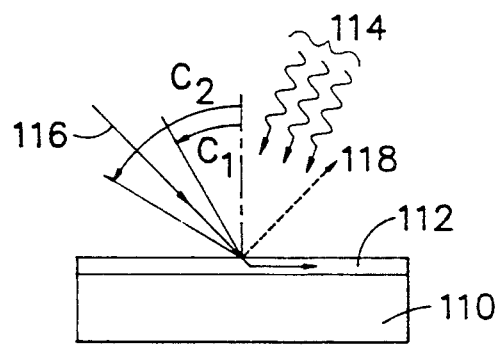

The dielectric loss of the polyaniline polymeric compositions can, according to the present invention, be controlled by the design of the chemical composition of the polyaniline polymer, the oxidative state of the polymer, and the degree of doping, including but not limited to, protonation and pseudoprotonation of the polymer. Thus, by the addition of electron-withdrawing or electron-donating groups to the nitrogen atoms and/or to the $C_6$ rings of the leucoemeraldine, emeraldine, or pernigraniline polyaniline compositions, the dielectric loss tangent can be varied. For example, addition of a methyl group to each $C_6$ ring to form poly(ortho-toluidine) leads to a dielectric loss tangent that can be varied from $10^{-2}$ to $10^0$. By the present invention dielectric loss tangents can be varied from $10^{-2}$ to approximately 20 by varying the form of the polyaniline, the degree, site and type of substituents. In the prior art, carbon filled silicone rubber or carbon filled epoxy paints or carbon bonded to fabric produce non-magnetic dielectric losses at microwave frequencies. A preferred embodiment of the present invention for attaining maximum dielectric loss is the emeraldine salt, wherein y is in the range of from approximately 0.4 to 0.6 and the protonation is approximately one proton per imine nitrogen, i.e., $[H^+]/[-N=]$ is equal to approximately one.

The addition of electron-withdrawing or electron-donating groups to the polyaniline composition can facilitate the design of a polymeric material with desired absorption and transmission bands. Known electron-donating groups to be substituted onto the $C_6$ ring and operative in the present invention can include, but are not limited to, $-OCH_3$, $-CH_3$, halogens (electron-donating by way of a resonance effect), $-NR_2$, $-NH-COR$, $-OH$, $-O-$, $-SR$, $-OR$, and $-OCOR$. These groups or atoms possess one or more unshared electron pairs on the atom adjacent to the ring. Known electron-withdrawing groups can include halogens (electron-withdrawing by way of an inductive effect), $-NO_2$, $-COOH$, $-COOR$, $-COR$, $-CHO$, and $-CN$. Thus, the addition of electron-donating groups to the rings of polyaniline augments the charge delocalization. The added opportunities for resonance stabilization of the pi to pi* excited stat provided by electron-donating groups causes a marked lowering in the requirement for excitation energy, and thus a decreased frequency (longer wavelength) of absorption. Conversely, the addition of electron-withdrawing groups diminishes the opportunities for resonance stabilization, causing an increase in the requirement for excitation energy, and thus an increased frequency (shorter wavelength) of absorption. Thus, for example, protonation of $-NH_2$ changes it to $-NH_3+$; this group no longer has an unshared pair of electrons to participate in charge delocalization. Alteration of $-OH$ to the ion, $-O-$, provides further opportunity for participation of unshared electrons on oxygen in charge delocalization. Thus, the change of H to $NH_2$ is bathochromic; $NH_2$ to $NH_3+$ is hypschromic; OH to $O-$ is bathochromic; and both of the changes, OH to OCOCH$_3$ and NH to NHCOCH$_3$ (acetylation), are hypsochromic.

The electron-withdrawing or electron-donating group can be present on the C$_6$ rings or the nitrogen atoms of the polyaniline composition at any desired percentage of the available sites. The electron-withdrawing or electron-donating groups are added to the C$_6$ ring sites or the nitrogen atom sites by chemical techniques known to those skilled in synthetic organic chemistry.

In this manner, a polyaniline composition is prepared which when produced in a flexible sheet form or which is coated onto a flexible substrate can be used to absorb electromagnetic radiation. Thus, a means of rendering an object undetectable to electromagnetic radiation such as radar is produced by the present invention by draping over the object the flexible polyaniline film or the coated flexible substrate, such as a cloth fabric or fishnet. Furthermore, by coating electromagnetic radiation-absorbing polyaniline compositions onto fibers, and then producing woven or non-woven fabrics from the coated fibers, cloth or clothing which is radiation absorbing could be produced, according to the present invention. In another embodiment, fibers of polyaniline itself or a derivative thereof, or fibers of polyaniline copolymerized with another polymer can be drawn or extruded and subsequently woven into electromagnetic radiation absorbing fabric, garments, coverings, and the like. In this manner radar absorbing clothing can be produced.

A further advantage of the present invention is that the polyaniline compositions and derivatives thereof have, or can be designed to have, desired processability in terms of, for example, viscosity, flexural strengths, solubility, adhesion to substrates, crosslinking, melting point, weight, adaptability to filler loading and the like. This is achieved by varying as desired the degree of protonation, the state of oxidation, and the type and degree of substituents on the polymer. Certain substituents may be preferred for the facilitation of desired processing parameters, such as increasing or decreasing solubility, altering extrusion parameters (rheology), achieving a specific viscosity, and the like. Derivatization is also useful for achieving compatibility with a copolymer, facilitating the tunability of the polyaniline composition for non-linear optics applications, and for specific wavelength absorption, such as microwave attenuation or a particular photoresponse.

The polyaniline compositions useful in the present invention can be coated by a variety of techniques onto substrates of choice. The polyaniline polymers can be applied to substrates according to the present invention by spray coating, dip coating, spin casting, transfer roll coating, brush-on coating, and the like. The polyaniline polymers can also be electrochemically deposited onto conductive substrates by known electrochemical deposition techniques.

According to the present invention, polyaniline can also be entrained within a matrix of, or copolymerized with, another polymer material to thereby produce a blend or a composite. Thus, polyaniline could be dispersed in, for example, polyethylene, polyimide, cellulose nitrate, and the like, and also can be coated onto fibrous materials. In addition, derivatization of the polyaniline compositions can enhance compatibility and processability of the polymer with other polymers.

In addition, the polyaniline compositions can be cast as thin films from a solvent solution, and the solvent evaporated to produce free standing films. The polyaniline films can be stacked as a composite with other polyaniline films, with films of polyaniline copolymerized with another polymer, or with non-polyaniline polymers and/or copolymers. Depending on the desired type and degree of substitution of the polyaniline with various crosslinkable functional moieties, the films produced can be cured in deeper sections, that is, thicker films or articles can also be produced by known polymer preparation techniques. Such thicker polyaniline materials will have some utility in certain non-linear optics applications, but will be even more preferred in certain radiation absorption applications, such as microwave attenuation.

Polyaniline will absorb electromagnetic radiation in the visible spectrum, in the infrared range, and in the ultraviolet range. Thus, the present invention further relates to a method of absorbing infrared, visible, or ultraviolet waves comprising exposing the polyaniline to infrared, visible, or ultraviolet waves, whereby the infrared, visible, or ultraviolet waves are absorbed by the polyaniline. The present invention also relates to a method for absorbing microwave radiation comprising exposing polyaniline to microwave radiation, whereby the microwave radiation is absorbed by the polyaniline.

Because polyaniline compositions are shown by the present invention to absorb electromagnetic radiation, another object of the invention is electromagnetic shielding. A thin film of polyaniline within, for example, the walls of television sets, computers, electronic machinery, and places for the storage of electronic data, such as computer semiconductor memories, will effectively absorb continuous and intermittent electromagnetic radiation from wires, coils, cathode tubes, etc. Protection against unwanted or unknown electronic surveillance of rooms can be achieved by the application of polyaniline to the walls, floor, and ceiling. Similarly, electrical wires can be shielded by the incorporation of a layer of polyaniline material into the plastic insulator coating on the wires with the advantage of grounding and static free property.

In addition, polyaniline can be used to make a remote thermal switch by exposing the polyaniline composition to microwave radiation. The polyaniline composition absorbs the radiation, which heats up the polyaniline, which in turn, can trigger a thermocouple placed in contact with the polyaniline composition. Upon removal of the source of microwaves, the polyaniline composition will cool and cause the thermocouple to switch back. By this manner a thermal switch is produced.

Thus, the present invention relates to a composition for absorbing electromagnetic radiation, wherein said electromagnetic radiation possesses a wavelength generally in the range of from about 1000 Angstroms to about 50 meters, wherein said composition comprises a polyaniline composition of the formula I, above, or a protonated salt thereof, where y is in the range of approximately 0.2 to 0.8, and the degree of protonation, i.e., $x = [H^+]/[-N=]$, varies from $x=0$ through $x=1$.

The instant invention further relates to a method of applying heat to a substrate, said method comprising the steps of:

(a) applying to a substrate a microwave radiation-absorbing polyaniline composition, or a partially protonated salt thereof;

(b) exposing the microwave radiation-absorbing polyaniline composition, for example, a partially protonated salt thereof, to microwave radiation, whereby the microwave radiation-absorbing polyaniline composition, or the partially protonated salt thereof, absorbs the microwave radiation, resulting in the generation of thermal energy within the polyaniline composition. This heat can be localized, transferred from the polyaniline composition or the salt to a substrate and utilized to accomplish desired results, such as, but not limited to, joining of materials. Thus, two materials which have been placed in contact or close proximity with each other and in contact with a polyaniline composition can be adhered to each other upon the exposure of the polyaniline composition to sufficient microwave radiation to heat and thus melt or at least soften at least one of the materials to enable fusing. The frequency, duration and/or intensity of the microwave radiation necessary to achieve the desired adhesion of the two materials will vary depending on the nature of the materials to be adhered and on the degree and type of protonation and/or substitution, if any, on the polyaniline. The preferred frequency of the microwave radiation to be absorbed by the polyaniline compositions to thereby induce localized heating is from about $10^9$ Hz to about $10^{11}$ Hz. The polyaniline composition can be applied to one or both of the materials in any pattern, such as a grid pattern, stripes, spots, or the like as desired. The polyaniline can be applied via solution coating, adhesion of films, vapor deposition, extrusion of gels containing polyaniline, and other known application techniques.

In a preferred embodiment of the present invention directed toward the adhering of two or more materials by the absorption of microwave radiation by polyaniline, at least one of the materials to be adhered is a plastic. In another embodiment of the present invention one of the materials to be adhered is a silicate-containing material, such as, for example quartz or glass. In this manner, a plastic can be adhered to a glass fiber, such as an optical fiber, by means of exposure of the polyaniline to microwave radiation.

According to the present invention, polyaniline compositions can also be utilized to absorb radar waves possessing a wavelength in the general range of from about 0.01 cm to about 100 cm. The absorption of radar waves by the polyaniline composition would assist in rendering objects coated with the polyaniline composition relatively invisible to radar detection. Therefore, the instant invention further relates to a method for absorbing radar waves comprising exposing a polyaniline composition or a partially protonated salt thereof to radar waves whereby the polyaniline composition or the salt thereof absorbs at least some of the radar waves. The invention further relates to a method for reducing the detectability by radar of an object comprising applying to the object a polyaniline composition or a partially protonated salt thereof in an amount sufficient to absorb at least some, and preferably all, radar radiation to which the object may be exposed.

In a preferred embodiment of the method for reducing the detectability by radar of an object it is desirable to coat the object in such a way as to produce a gradient of absorption to minimize reflectance. Such a gradient of polyaniline material can be achieved by varying the degree of protonation of the polymer or the degree of substitution on either the $C_6$ ring or the nitrogen atoms or both with a chemical substituent such that an incoming radar beam first encounters a polyaniline composition with little or no protonation, i.e., a material with limited absorption of radiation. As the beam further advances along the gradient of polyaniline material covering the object, the beam encounters polyaniline polymer with continually increasing degrees of protonation, and hence increasing degrees of electromagnetic absorption. In this manner, little or no reflection of the beam is produced and the object is not detectable by a radar wave reflection.

The present invention further relates to a method of electrochemical switching of the polymeric state of a polyaniline composition. By contacting the polyaniline composition with an electrolyte, electrochemical switching of the polymeric state can be significantly accelerated, being accomplished on a time scale of approximately $10^{-5}$ seconds. By contacting the polyaniline composition with a solid electrolyte, electrochemical switching of the polymeric state can be even further accelerated, being accomplished on a time scale of less than approximately $10^{-7}$ seconds. For electromagnetic radiation absorption, such as the absorption of microwave radiation, electrochemical switching of the polymeric state can turn the polymeric material from radiation transparent to radiation absorbing, or vice versa, depending on the nature and direction of the electrochemical switching. For non-linear optics, electrochemical switching can change the important absorption and/or transmission bands for the probe and modulator beams, such as, for example, in switching from the emeraldine base form to the emeraldine salt form of polyaniline. The range of the absorption bands for the base and the salt can be shifted bathochromically (i.e., shifted to longer wavelengths) or hypsochromically (i.e., shifted to shorter wavelengths) as may be desired according to the characteristics of the available probe beam, the available modulator beam, or the available detector or sensor, or any combination thereof.

Polyaniline compositions can also be used according to the present invention as a photoactive switch by manipulation of the index of refraction of the polyaniline compositions. Because of the extremely rapid photoresponse of the polyaniline polymer, it is therefore useful according to the present invention in nonlinear optical devices. The time dependence of the photo bleaching of the polymer is on the order of picoseconds. For example, the application of a laser beam of wavelength 6250 Angstroms (2.0 eV) to polyaniline polymer produces significant photoinduced bleaching (i.e., increased transmission) in broad energy bands of 8,265 Angstroms to 4,590 Angstroms (approximately 1.5 eV to 2.7 eV) and again at 3,760 Angstroms to 2,880 Angstroms (approximately 3.3 eV to 4.3 eV). Simultaneously laser beam photoinduced absorption (i.e., decreased transmission) for polyaniline occurs at 24,800 Angstroms to 8,265 Angstroms (approximately 0.5 eV to 1.5 eV) and from 4,590 Angstroms to 3,760 Angstroms (2.7 eV to 3.3eV). Photoinduced absorption and bleaching occur in polyaniline compositions in less than $10^{-12}$ seconds. These photoinduced changes in absorption correspond to changes in the index of refraction at these wavelengths. These changes in optical constants have broad application in nonlinear optical signal processing and optical communications, which according to the present invention, are useful as means to switch, modulate, multiplex, focus, and provide optical bistability for commercial systems.

Polyaniline is therefore useful in nonlinear optical signal processing according to the present invention. For example, a thin film coating of polyaniline can be applied to a phototransmissive substrate. In one embodiment of the present invention, a probe beam of light of a given wavelength is then propagated through the noncoated side of the substrate onto the coating at the critical angle to the polyaniline such that the probe beam is wave-guided in the phototransmissive substrate. To activate the desired switching property of the polyaniline coating, a pump beam of light, also called a modulator beam, of a different wavelength or some wavelength is applied to the coating through the coated or noncoated side of the substrate at a second angle such that the index of refraction of the polyaniline composition is changed by the absorption by the polyaniline of the electromagnetic radiation of the modulator beam. The wavelength of the modulator beam can vary widely, but is preferably within the range of from about 12,100 Angstroms (1.5 eV) to about 21,775 Angstroms (2.7 eV). The change in the refractive index of the polyaniline composition coating alters the transmissive property of the polyaniline and allows the probe beam to be refracted or otherwise modified by the polyaniline coating. This refraction or other modification of the probe beam can, for example, be used to trigger a photocell, initiate or terminate an optical signal, encode information on the probe beam, or the like. By these means is produced a low cost, stable means of optical signal processing.

In an alternative embodiment, the beam to be modulated is refracted by the phototransmissive substrate and reflected off the polyaniline coating on the backside of the substrate such that the beam is then reflected repeatedly between the front side of the substrate and the polyaniline coated back side of the substrate. This reflection continues within the phototransmissive substrate until the modulating beam is caused to impinge on the polyaniline coating, whereby the index of refraction of the polyaniline coating is altered by the absorption of the electromagnetic radiation of the modulator beam, altering the propagation of the probe beam. In this manner the polyaniline coating has acted as a switch which is reversibly controlled by the presence of the pump or modulating beam to increase or decrease the modulation (both intensity and direction) of the probe beam. Because of the very rapid photoresponse rate of the polyaniline polymer, the refractive index can be altered at gigahertz to terrahertz rates, thereby providing a method for the rapid modulation of optical data signals.

In yet another preferred embodiment, the beam to be modulated is caused to impinge upon a thin coating of polyaniline which is on a phototransmissive substrate. A portion of the beam is reflected, the remainder refracted, transmitted, and partly absorbed Application of a modulator beam at a second angle changes the index of refraction of the polyaniline thereby altering the direction and the percentage of the probe beam transmitted and reflected. The preferred embodiment has the probe beam incident on the polyaniline at the critical angle and the modulator beam preferably of wavelength between 12,100 Angstroms (1.5 eV) and 21,800 Angstroms (2.7 eV).

Thus, the present invention further relates to a method of changing the refractive index of polyaniline comprising the steps:

(a) applying polyaniline to a phototransmissive substrate;

(b) applying a first beam of light of wavelength x at the critical angle y to the polyaniline surface; and (c) applying a second beam of light of wavelength z to the polyaniline surface, whereby the second beam is absorbed by the polyaniline changing the index of refraction of the polyaniline, whereby the transmission of the first beam through the phototransmissive substrate is altered. The preferred wavelength x of the first or probe beam of light is dependent on the form of polyaniline utilized. For emeraldine base polymer, the preferred wavelength x of the first or probe beam of light is in one or more of the ranges of approximately 0.6 eV to 4.2 eV; 0.8 to 1.1 eV; 1.6 to 2.4 eV; 2.8 to 3.2 eV; and 3.4 to 4.3 eV. The preferred wavelengths will vary depending on the degree of protonation of the polyaniline polymer and the nature of the substituents, if any, on the polymer. For the emeraldine base polymer, the preferred wavelength z of the second or modulating beam of light is in the range of approximately 1.7 eV to 2.7 eV. The preferred wavelength of the second or modulating beam is determined by the oxidation state, protonation level, and substituents of the polymer. For the leucoemeraldine polymer the preferred wavelengths of the probe beam are in the range of 24,800 Angstroms to 8,265 Angstroms (0.5 to 1.5 eV) and 4,590 Angstroms and 3,760 Angstroms, with greater preferred modulator beam wavelength of 3,760 Angstroms to 2,880 Angstroms. For pernigraniline, the preferred probe and modulator wavelength are similar to emeraldine.

The photoswitching phenomenon can, according to the present invention, also be used to couple a light signal from one optical fiber to another optical fiber. The two optical fibers are positioned in close contact with each other and with a thin film of polyaniline composition between them. The polyaniline composition is then exposed to a modulating beam. The modulating beam changes the index of refraction of the polyaniline such that "crosstalk" between the two optical fibers is obtained. This allows the optical signal within either of the optical fibers to be coupled to the other fiber as desired, but without permanent physical alteration of either fiber. In addition, the coupling can be turned on and off as desired by the manipulation of the index of refraction and, because of the very rapid photoresponse rate of the polyaniline polymer, the refractive index can be altered and coupling achieved at gigahertz to terrahertz rates.

In yet another embodiment of the present invention the polyaniline composition can itself be utilized simultaneously as the phototransmissive material and a photoswitch without a phototransmissive substrate. Thus, a free standing polyaniline polymer can be exposed to a first beam of light which will be transmitted through the polyaniline with some attenuation. When the polymer is exposed to a second or modulator beam the refractive index and absorption coefficient of the polyaniline polymer are altered, changing the intensity and angle of refraction of the beam transmitted through the polymer.

Another embodiment of the present invention is the use of polyaniline compositions as a masking material over ultraviolet-curable polymers in the fabrication of positive resist and negative resist microelectronic devices and circuits. In the fabrication of certain positive resist and negative resist microelectronic devices and circuits, radiation curable polymers are deposited on conductive or semiconductive surfaces, such as silicon or doped silicon. A circuit pattern is then applied by means of photolithographic techniques and covered by ultraviolet-curable polymers in certain desired patterns.

Ultraviolet radiation is then applied to the polymers to cure certain portions, after which the uncured portions are removed by solvent rinsing, for example. In this manner, patterns of cured polymer are provided on the conductive or semiconductive surfaces. By the present invention, polyaniline can be applied to the curable polymer in a predetermined pattern such that the polymer beneath the polyaniline pattern is desired to remain uncured upon exposure of the coated device or circuit to radiation. When the polymer is exposed to the radiation, the polyaniline would absorb the ultraviolet radiation to thereby mask the polymer and prevent the cure in certain locations of the curable polymer beneath.

Thus, the present invention relates to a method for masking a radiation curable polymer applied to an electronic circuit or device, said method comprising the steps of (a) applying a radiation-curable polymer or prepolymer to an electronic device or circuit; (b) applying to the radiation-curable polymer or prepolymer a polyaniline composition; (c) exposing the device or circuit with the curable polymer or prepolymer and the polyaniline composition to radiation sufficient to cure the curable polymer or prepolymer and whereby the polyaniline composition absorbs some of the ultraviolet radiation; and (d) removing the polyaniline and any uncured curable polymer or prepolymer. In a preferred embodiment of the invention, the curable polymer or prepolymer and the polyaniline are independently deposited onto the surface of the electronic device or circuit by means of a solvent solution of each material, followed by the evaporation of the solvent. By "cure" herein is meant sufficient coreaction and/or crosslinking reactions have taken place to render the material a solid not easily removed by solvent.

We have developed a series of devices which utilize the features, characteristics and properties of the polyaniline compounds which are described above. First is a series of optical devices and second a series of microwave devices.

The optical devices are useful in a range of the electromagnetic spectrum at or near what is commonly referred to as light. These devices utilize the fact that the index of refraction of the polyaniline compounds may be controlled by varying the intensity and wavelength of light radiated upon the polyaniline compound. Thus, a pumping or modulating light at one or a broad band of frequencies may be used to modulate the index of refraction of the polyaniline compound and thereby modulate light at another frequency. For example this can be used for the coupling of the modulated light from one light transmissive medium to another or modulating its angle of departure from an interface between two light transmitting media. The spectral response of this photo effect is substantially changed as the compounds are more fully protonated with the largest response in the unprotonated material. Thus, the unprotonated polyaniline bases are preferred for some applications.

We have devised devices which can operate as various types of light valves, as a phase velocity modulator and for con-trolling the angle of emission of a light beam. The light valves may be light switches turning the modulated beam on or off or variable valves which permit the intensity of the modulated light beam to be varied continuously over a range by varying the intensity of the modulating light beam. In a valve the modulating light beam pumps the electrons into higher energy bands causing the critical angle for a light beam incident upon an interface to be increased for some frequency bands and decreased for other bands as the intensity of the pump or modulating light increases.

FIG. 1 illustrates one such device. It has a substrate 110 supporting a polyaniline mass 112 in the form of a film bonded to the substrate 110. The interface between the polyaniline film 112 and the air will have a critical angle of, for example, C1 when the modulating light 114 does not pump the polyaniline film 112 and a critical angle C2 when the pump light 114 is intense. The angles are greatly exaggerated for illustration. In this example when the modulating light 114 does not pump the polyaniline film 112, a light beam 116 which is incident upon the polyaniline film at an angle greater than the critical angle C1 will not be substantially transmitted into the film 112 but instead will be reflected along a path 118. However, when the modulating beam 114 is turned on for pumping, the critical angle increases to angle C2 thus permitting the coupling of light from the beam 116 into the film 112.

We have found that the critical angle is increased by an increase in the intensity of the modulating beam for some frequency ranges of incident modulated light and is decreased for others. Thus, the illustration of FIG. 10 continues to be accurate for all events. However, for some frequencies of incident, modulated beam, the critical angle when the polyaniline is not pumped is the greater angle and then decreases to C1 as pumping energy is increased.

The result is that the incident light beam is always substantially equal to the critical angle being either slightly greater or lesser than the precise critical angle depending upon the incident beam frequency. Thus, the structure can be used so that increasing the intensity of the pumping, modulating beam 114 will turn off the coupling of light from one transmission medium to another for some optical bands while turning on the coupling for other bands.

Figure 2:
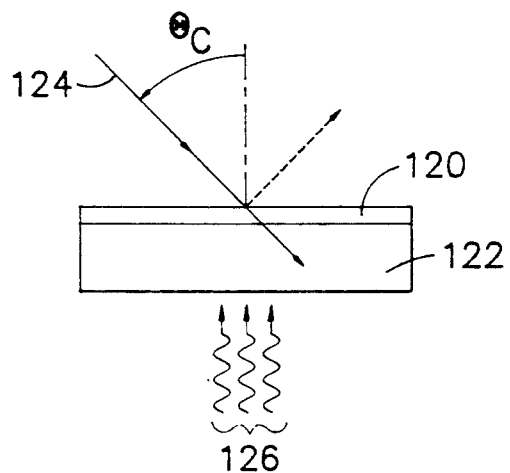
Figure 10:
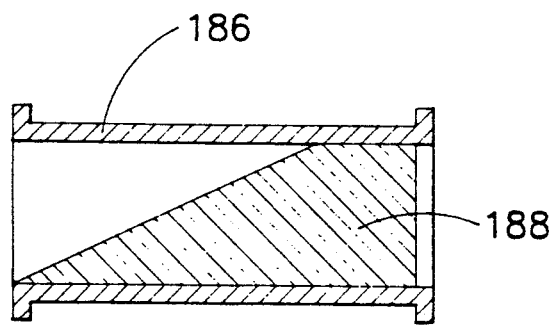

FIG. 2 illustrates a structure utilizing the same principles as illustrated in FIG. 10 but for coupling the light from the polyaniline film 120 into another light transmissive medium 122. However, in the structure of FIG. 11, the interface at which the critical angle is important is the interface between the polyaniline film 120 and the light conductor 122. Thus, in the embodiment of FIG. 11 the incident light beam 124 must be incident at an angle such that after it enters the polyaniline film and is refracted along a different path it will approach the interface between the polyaniline film 120 and the transmissive substrate 122 at substantially the critical angle, being greater or lesser than the critical angle by a smaller amount in accordance with the principles described in connection with FIG. 1. The coupling of light from the polyaniline layer of 120 to the other layer is thus controlled by the modulating light 126. From the above description it is apparent that a beam in the opposite direction may also be similarly controlled.

Figure 3:
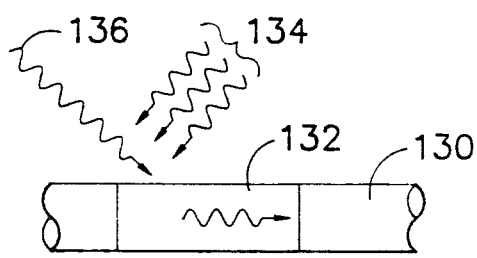

FIG. 3 illustrates another embodiment similar to the embodiment of FIGS. 1 and 2. In FIG. 3, however, an optical fiber light conductor 130 has a polyaniline layer 132 upon at least a portion of its outer longitudinal surface. In this manner a pumping light 134 can control the coupling of an incident light beam 136 into the optical fiber 130.

Figure 4:
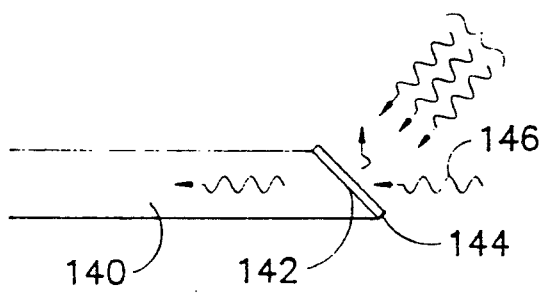

FIG. 4 illustrates an optical fiber 140 having an endface 142 which is lapped at substantially the critical angle for the interface between the optical fiber 140 and a polyaniline layer 144 coated on the lapped endface.

An incident light beam 146 may be directed upon the polyaniline film 144 parallel to the longitudinal optical axis of the optical fiber 140. The device operates on the same principles described in connection with FIGS. 1 and 2 except the light beam when coupled into the optical fiber 140 enters along the longitudinal optical axis.

FIGS. 5 and 6 illustrate yet another device in which a pair of optical fibers 150 and 152 are controllably coupled together by an interposed polyaniline mass 154 joining the two fibers. Together these form three light conducting media. An input light beam 156 propagating along the fiber 150 enters the region along which the polyaniline 54 is distributed. The coupling of light into the polyaniline 154 and into the second optical fiber 152 is controlled by the pumping beam 158 so that some of the light from input light 156 is coupled into optical fiber 152 to provide as output light 159.

FIG. 7 illustrates a Mach Zehnder interferometer made up of light conductors in which input light 160 arrives in optical fiber 162 and is divided into two paths 164 and 166. These two paths are recombined at optical fiber 168. In accordance with the principles of the prior art Mach Zehnder interferometer, if the two beams arrive in phase in the output fiber 168 they constructively interfere and the light beam and any associated signal continues along the path. However, if the beams destructively interfere, the light beam is destroyed. By variably controlling or altering the phase velocity through the branch 166, the relative phases of the two light signals recombining at output optical fiber 168 may be controllably varied between constructive and destructive interference.

While the Mach Zehnder interferometer is old and known, we have found a new manner of controlling the phase velocity in the branch 166. The branch 166 is coated with a layer of the photo responsive polyaniline film 170. A variable intensity pumping light 172 for modulating the index of refraction of that layer is used to control the phase velocity of the light through the branch 166. Thus, varying the intensity of the modulating or pumping light 172 changes the phase velocity in the branch 166 and therefore changes the phase relationship between the two arriving signals in the output fiber 168.

The microwave devices of the present invention arise because we have discovered that a highly protonated emeraldine salt polymer has a high dielectric loss which we attribute to its combination of a modest conductivity and a high dielectric constant. The loss tangent, a quantitative indication of the energy loss in the polymer, is a function of the protonation level of the polymer and increase as the protonation level increases reaching a maximum at complete 50% protonation. Very importantly, the protonation level may be controlled as described above in the synthesizing of the material and also may be varied by changing the potential by means of an electrochemical cell. This permits the polymers to be made with a variety of selected loss tangents and further permits the loss tangents of the polymers to be variably controlled in a variety of useful devices. For example the microwave properties may be turned on and off or varied over a range.

In FIGS. 8 and 9 a layer 180 of protonated polyaniline is bonded to the interior walls of a wave guide 182. As the microwave propagates from the input end 183 to the output end 184, it is attenuated in the polyaniline layer. This layer may be formed with a continuously changing protonation level along the propagation axis of the waveguide to provide a selected protonation gradient and therefore loss gradient between the input end 183 and output end 184. This gradient can be contoured to minimize reflections where the propagating microwave encounters the transition from an absence of polyaniline layer to the presence of the layer. Additionally, the layer may be geometrically formed to gradually taper to a greater thickness as the microwave propagates from the input end 183 to the outlet end 184.

FIG. 10 illustrates a similar wave guide 186 having a mass of polyaniline 188 formed so that it has a geometrical configuration providing an increase in thickness, that is an increase in its cross sectional area in planes perpendicular to the axis of propagation.

Figure 11:
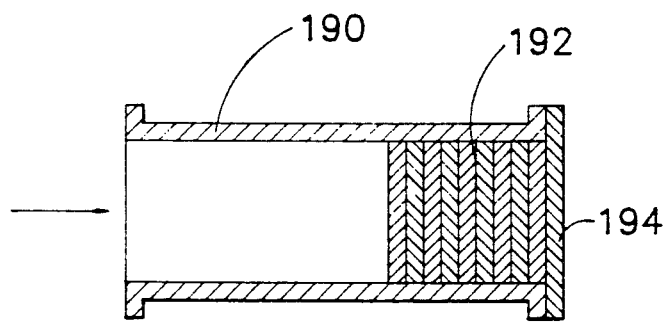

FIG. 11 illustrates another embodiment of the invention in which the polyaniline mass is positioned within the interior of a waveguide 190 and also extends between its walls. In the interior of the embodiment of FIG. 11 there is positioned a plurality of laminated layers 192 of polyaniline each layer having a different protonation level. This structure is particularly suitable for terminating the end 194 of a waveguide 190 in a manner to prevent reflections. Other circuitry may be used to direct unwanted microwave energy, for example, into the illustrated wave guide where it can be effectively attenuated. In order to minimize reflections, as described above, the layers initially encountered by the incoming microwave are the least protonated so they are the less absorptive. The layers become increasingly more protonated and therefore more absorptive as they are positioned closer to the end 194 of the wave guide 190. Preferably, the average gradient of the variation in protonation and therefore in the variation in absorption is approximately a linear function of distance along the propagation axis.

Figure 12:
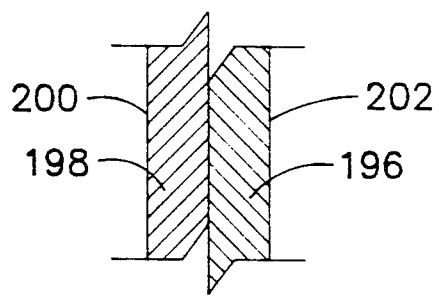
FIG. 12 illustrates an alternative embodiment in which a surface is coated with a material embodying the present invention for preventing microwave reflections from the coated material.

Referring to FIG. 12, if it is desired to prevent reflections of microwave energy from a metallic or other reflective surface 196, the surface may be coated with a polyaniline layer 198 which is provided with a protonation gradient which increases from near 0% at the exposed outer surface 200 to a much greater level, 50% for example, at the interface 202 between the reflection surface 196 and the polyaniline layer 198.

Figure 13:
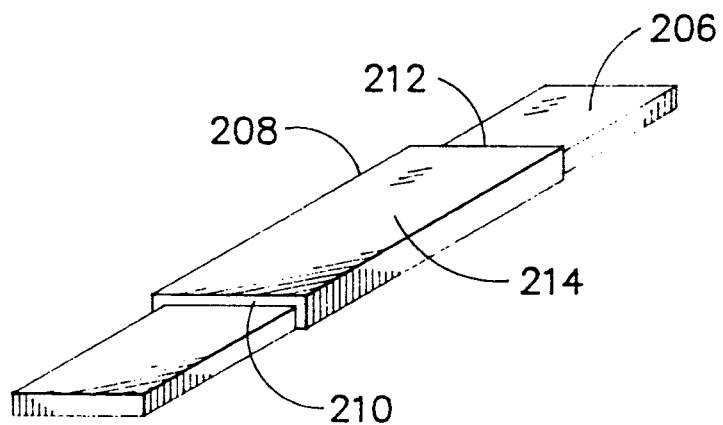
FIGS. 13 and 14 illustrate alternative embodiments in which a microwave strip conductor is coated with material embodying the present invention.
Figure 14:
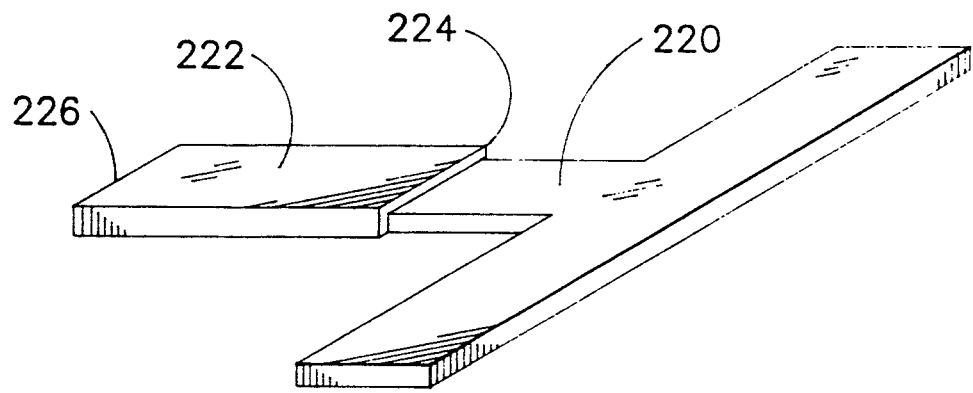
Figure 15:
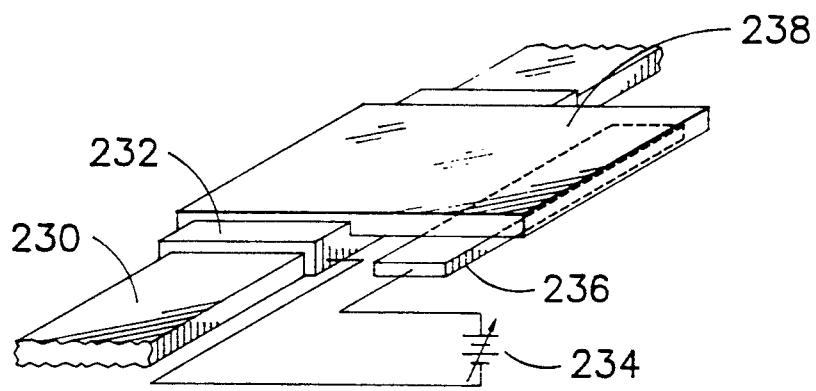

Similarly, as illustrated in FIGS. 13, 14 and 15 the polyaniline absorptive layer may be bonded to the exterior surface of a microwave strip conductor such as conductor 206 in FIG. 13. This provides a convenient means for introducing attenuation onto a microwave strip conductor used in miniature or integrated circuits while minimizing reflections from it. For example, the polyaniline layer 208 may be synthesized as described above so that it has a variation in its protonation or pseudo-protonation as a function of its position or distance along the axis of propagation of the strip conductor. The protonation varies from a minimum protonation level at its opposite ends 210 and 212 increasing toward the central region to a maximum protonation at the central region to 214.

FIG. 14 illustrates use of the polyaniline as a terminating absorber on the end of a branch of the microwave strip conductor 220. The polyaniline layer 222 is formed with a protonation gradient extending from a minimum protonation at its input end 224 to a maximum protonation at its terminating end 226.

The gradual variation in the microwave loss tangent so that absorption increases gradually from the input end to the opposite end along the propagation axis may alternatively be accomplished or may be supplemented by increasing the thickness of the polyaniline layer to also increase energy absorption.

One major advantage of polyaniline materials used in the present invention is that their protonation and therefore their absorption or loss tangent may be controlled by an electrical potential. This feature may be utilized in many various embodiments of the invention but is illustrated in FIG. 15.

FIG. 15 illustrates a microwave strip conductor 230 upon which a polyaniline layer 232 is positioned of the type illustrated in FIG. 13. The strip may, if desired, have a protonation or a thickness gradient. This layer, because it is also conductive, may also serve as one electrode of an electrochemical cell. It is connected to a variable potential 234. The other terminal of the variable potential 234 is connected to the other electrode 236 of this electrochemical cell. A solid or liquid electrolyte 238 is positioned between the electrodes 232 and 236. Thus, the application of the variable potential 234 permits the potential of the polyaniline 232 to be varied, controlling or varying its protonation as a function of the potential and thereby varying its absorption or loss tangent. In this manner, the effect of the polyaniline layer 232 may be switched on and off by switching the polyaniline between fully protonated and unprotonated states and may be varied to intermediate levels of protonation.

Figure 16:
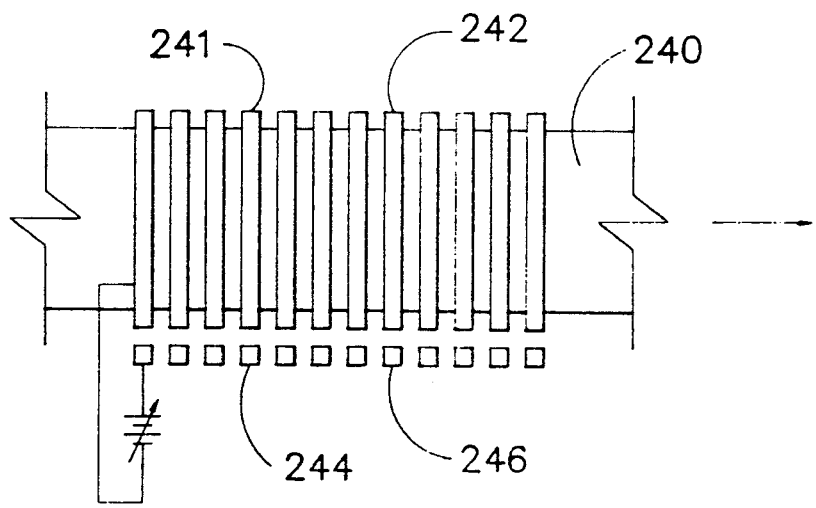

FIG. 16 illustrates a structure for controlling and varying the protonation gradient along a microwave strip conductor 240 by forming the polyaniline layer into a series of discrete segments 241 and 242 along the axis of propagation of the microwaves. Each individual polyaniline segment forms an electrode of a separate electrochemical cell. Each of these cells has a second electrode 244 and 246, for example, and an interposed electrolyte like the electrolyte 238 in FIG. 25 but separately associated with each individual electrochemical cell. A separate potential is applied for controllably varying the potential of each discrete segment of polyaniline mass along the propagation axis so that its loss tangent may be independently varied. Different potentials may be applied to each of these discrete cells to controllably contour the protonation gradient which is desired for particular circumstances.

Figure 17:
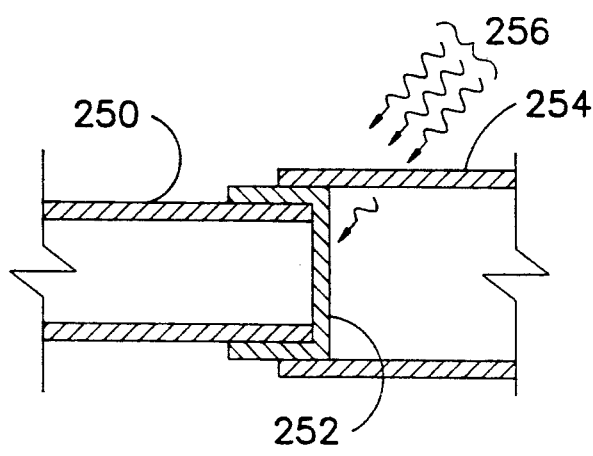
FIGS. 17 and 18 illustrate embodiments utilizing thermally responsive films which have materials embodying the present invention distributed within the film.
Figure 18:
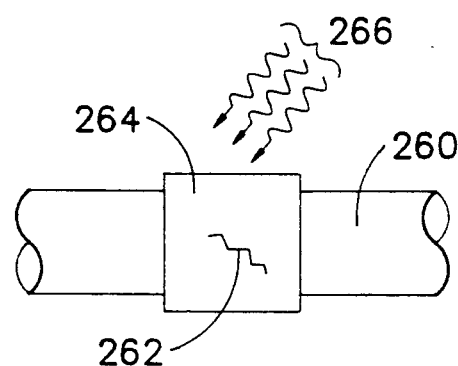

FIGS. 17 and 18 illustrate embodiments in which a thermally responsive film has microwave radiation absorbing protonated polyaniline salt polymer distributed in the thermally responsive film. The term distributed is intended to include the various chemical techniques for distributing the active materials in a thermally responsive film material, this includes dispersing and copolymerization. This distribution of the microwave radiation absorbing polymer in the thermally responsive film permits the film to be activated by microwave energy rather than by radiation with infrared energy. This is particularly useful in electrically insulative environments in which the energy may be coupled specifically into the thermally responsive film without undue heating of surrounding structure and from a remote source.

For example, if the principal carrier film is a thermally deformable film such as thermo-plastic film which softens and flows more easily when heated, it may be used to form a barrier or closure which can be destroyed from a remote position by irradiation with microwave energy. For example, FIG. 17 illustrates a conduit 250 having a thermoplastic film 252 with microwave radiation absorbing protonated polyaniline salt polymer distributed within it to form a barrier between the conduit 250 and a conduit 254. This sealing film will block passage of fluids, for example, past the barrier formed by the film 252 until the film is radiated by microwave energy 256 causing the barrier to be heated, softened and eventually separate to open the passage.

The microwave radiation absorbing protonated polyaniline salt polymer may also be distributed in or copolymerized with a conventional thermally activated shrink wrap film. For example, FIG. 18 illustrates a conduit 260 having a defect or crack 262. The film 264 is loosely wrapped around the conduit 260 and the film 264 is then irradiated with microwave energy 266 causing the polyaniline polymer to absorb the microwave energy convert it to heat thereby heating the film and activating its shrink properties.

The microwave absorptive polyaniline film can be advantageously used for shielding objects as mentioned above and is particularly useful for shielding a plurality of electrical conductors to form a shielded cable. The polyaniline shield not only prevents electromagnetic energy from entering the cable and thereby coupling noise into the conductors and prevents electromagnetic energy from exiting the cable but additionally because the polyaniline is also conductive, the outer conducting polyaniline shield may also be used to ground an electronic device to which it is connected. Thus, because the polyaniline is also conductive, it may not only absorb rather than merely reflect the microwave energy but it may also conduct current to maintain an electrical apparatus at a ground potential.

Figure 19:
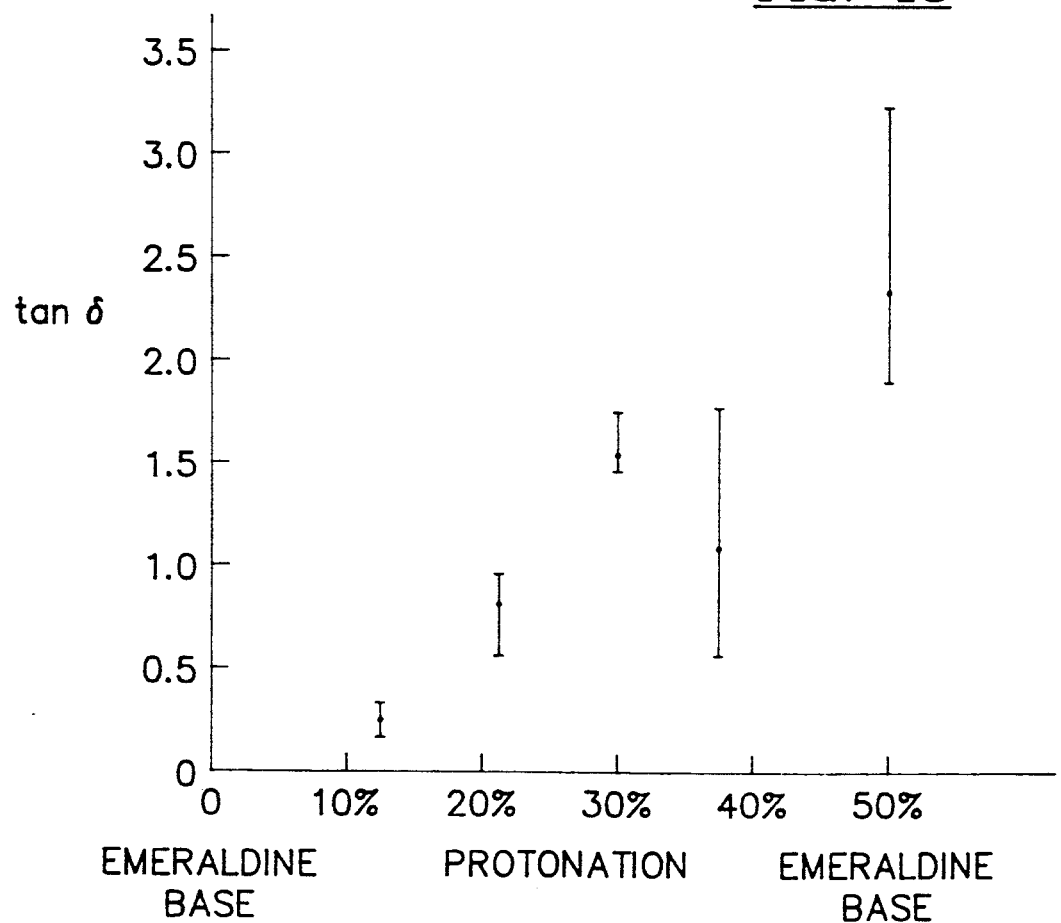
FIG. 19 is a graphical plot illustrating the variation of the loss tangent as a function of protonation.

In order to measure the variation in loss of the polyaniline polymer as a function of protonation, we measured the loss tangent for five different samples spaced across the range between the emeraldine base at no prontonation and the emeraldine salt at full 50% protonation. FIG. 19 is a plot of the results of the data illustrating the loss tangent in the vertical axis as a function of percent of protonation on the horizontal axis. For each sample there is illustrated a data point as well as error bars indicating the estimated accuracy with which the measurements were made. This graph illustrates the increase in loss within the polymer as protonation is increased.

While the invention has been disclosed in this patent application by reference to the details of preferred embodiments and examples of the invention, it is to be understood that this disclosure is intended in an illustrative rather than in a limiting sense, as it is contemplated that modiciations will readily occur to those skilled in the art, within the spirit of the invention and the scope of the claims which follow.

That which is claimed is:

1. A composition for absorbing electromagnetic radiation, wherein said electromagnetic radiation possesses a wavelength generally in the range of from about 1000 Angstroms to about 50 meters, wherein said composition comprises a polyaniline composition of the formula

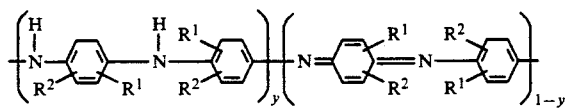

where y can be equal to or greater than zero, and $R^1$ and $R^2$ are independently selected from the group consisting of H, —OCH$_3$, —CH$_3$, —F, —Cl, —Br, —I, —NR$^3{}_2$, —NHCOR$^3$, —OH, —O$^-$, —SR$^3$, —OR$^3$, —OCOR$^3$, —NO$_2$, —COOH, —COOR$^3$, —COR$^3$, —CHO, and —CN, where R$^3$ is a C$_1$ to C$_8$ alkyl, aryl or aralkyl group.

2. A composition as claimed in claim 1 wherein the electromagnetic radiation is microwave radiation which possesses a wavelength generally in the range of from about 0.04 cm to about 25 cm.

3. A composition as claimed in claim 1 wherein the electromagnetic radiation is infrared radiation which possesses a wavelength generally in the range of from about 8,000 Angstroms to about 0.04 cm.

4. A composition as claimed in claim 1 wherein the electromagnetic radiation is visible light radiation which possesses a wavelength generally in the range of from about 4,000 Angstroms to about 8,000 Angstroms.

5. A composition as claimed in claim 1 wherein the electromagnetic radiation is ultraviolet radiation which possesses a wavelength generally in the range of from about 100 Angstroms to about 4,000 Angstroms.

* * * * *